United States Patent
Cimo et al.

(10) Patent No.: US 10,878,804 B2
(45) Date of Patent: Dec. 29, 2020

(54) VOICE CONTROLLED KEYWORD GENERATION FOR AUTOMATED TEST FRAMEWORK

(71) Applicant: INTERNATIONAL BUSINESS MACHINES CORPORATION, Armonk, NY (US)

(72) Inventors: Jerry Cimo, Wappingers Falls, NY (US); Omar Hashmi, Poughkeepsie, NY (US); Megan Bridge, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 157 days.

(21) Appl. No.: 16/156,128

(22) Filed: Oct. 10, 2018

(65) Prior Publication Data

US 2020/0118546 A1    Apr. 16, 2020

(51) Int. Cl.
*G10L 15/06*     (2013.01)
*G10L 15/22*     (2006.01)
(Continued)

(52) U.S. Cl.
CPC ............ *G10L 15/063* (2013.01); *G10L 15/19* (2013.01); *G10L 15/22* (2013.01);
(Continued)

(58) Field of Classification Search
CPC ....... G10L 15/063; G10L 15/19; G10L 15/22; G10L 15/1822; G10L 2015/0638; G10L 2015/088
See application file for complete search history.

(56) References Cited

U.S. PATENT DOCUMENTS 6,993,487 B2    1/2006  Bluvband
7,631,227 B2   12/2009  Poisson et al.
(Continued)

FOREIGN PATENT DOCUMENTS

CN    106874185 A  *  6/2017
WO    0231814 A1      4/2002

OTHER PUBLICATIONS

Mell, Peter et al. "The NIST Definition of Cloud Computing", National Institute of Standards and Technology, U.S. Department of Commerce; Sep. 2011; 7 pgs.
(Continued)

*Primary Examiner* — Mohammad K Islam
(74) *Attorney, Agent, or Firm* — Cantor Colburn LLP; Edward Wixted (57) ABSTRACT

Methods, systems and computer program products for voice controlled generation of keywords for test cases are provided. Aspects include receiving a verbal test plan for a computing system and analyzing the verbal test plan to identify a plurality of keywords. Aspects also include mapping each known keyword of the plurality of keywords to an existing grammar and obtaining, from a user, a definition for a new grammar for each unknown keyword of the plurality of keywords. Aspects further include analyzing a software being tested on the computing system and creating a test plan by respectively applying the new grammar and the existing grammar of the plurality of keywords to the software being tested.

20 Claims, 6 Drawing Sheets

(51) Int. Cl.
*G10L 15/19* (2013.01)
*G10L 15/18* (2013.01)
*G10L 15/08* (2006.01)

(52) U.S. Cl.
CPC .. *G10L 15/1822* (2013.01); *G10L 2015/0638* (2013.01); *G10L 2015/088* (2013.01)

(56) References Cited

U.S. PATENT DOCUMENTS

| | | | |
|---|---|---|---|
| 7,958,495 B2 | 6/2011 | Kelso | |
| 9,038,026 B2* | 5/2015 | Chandra | G06F 11/3684 717/124 |
| 9,928,160 B2* | 3/2018 | Champlin-Scharff | G06F 9/454 |
| 9,996,451 B2* | 6/2018 | Andrejko | G06F 11/3672 |
| 10,157,122 B1* | 12/2018 | Gohil | G06F 11/3688 |
| 2002/0032538 A1* | 3/2002 | Lee | G06F 11/3664 702/119 |
| 2007/0213988 A1* | 9/2007 | Hanson | G06Q 10/06 704/275 |
| 2008/0010539 A1* | 1/2008 | Roth | G06F 11/3688 714/38.1 |
| 2008/0120521 A1* | 5/2008 | Poisson | G06F 11/2294 714/26 |
| 2008/0244323 A1* | 10/2008 | Kelso | G06F 11/3608 714/38.14 |
| 2008/0244523 A1* | 10/2008 | Kelso | G06F 11/3664 717/124 |
| 2008/0244524 A1* | 10/2008 | Kelso | G06F 11/3688 717/124 |
| 2009/0133000 A1* | 5/2009 | Sweis | G06F 11/3688 717/124 |
| 2011/0276944 A1* | 11/2011 | Bergman | G06F 11/3684 717/124 |
| 2013/0007522 A1* | 1/2013 | Kurapati | G06F 11/2294 714/32 |
| 2013/0060507 A1* | 3/2013 | Kianovski | G06F 11/3668 702/123 |
| 2013/0097586 A1* | 4/2013 | Chandra | G06F 11/3684 717/124 |
| 2013/0198320 A1* | 8/2013 | Ahmed | G06F 11/3664 709/217 |
| 2013/0198567 A1* | 8/2013 | Ahmed | G06F 11/263 714/32 |
| 2013/0198568 A1* | 8/2013 | Ahmed | G06F 11/3684 714/32 |
| 2014/0109054 A1* | 4/2014 | Iwama | G06F 16/93 717/124 |
| 2015/0082277 A1* | 3/2015 | Champlin-Scharff | G06F 11/368 717/120 |
| 2015/0278075 A1* | 10/2015 | Loganathan | G06F 11/3684 714/38.1 |
| 2015/0324274 A1* | 11/2015 | Raghavan | G06F 11/3684 717/124 |
| 2015/0339213 A1* | 11/2015 | Lee | G06F 3/0484 717/125 |
| 2017/0329687 A1 | 11/2017 | Chorley et al. | |
| 2018/0121336 A1 | 5/2018 | Ayyappan et al. | |
| 2018/0322035 A1* | 11/2018 | Mohanty | G06F 11/3664 |
| 2018/0373620 A1* | 12/2018 | Thomson | G06F 11/3688 |
| 2019/0079853 A1* | 3/2019 | Makkar | G06F 8/71 |
| 2019/0155572 A1* | 5/2019 | Misra | G06N 5/022 |
| 2020/0110694 A1* | 4/2020 | Elking | G06F 11/3696 |

OTHER PUBLICATIONS

Sangave, Vishal et al. "Generic Test Automation", International Journal of Science and Research (IJSR); ISSN (onlin): 2319-7064; Index Copernicus Value (2013): 6.14; Impact Factory (2013): 4.438; pp. 2668-2671.

* cited by examiner

VOICE CONTROLLED KEYWORD GENERATION FOR AUTOMATED TEST FRAMEWORK

BACKGROUND

The present invention generally relates to test cases, and more specifically, to voice controlled generation of keywords for test cases.

Testing the functionality of software for computer systems can be complicated and require significant time. In order to test the functionality of software, a tester must first create a test case to run on the software. In many cases, the creation of test cases is a manual process that requires software programming skills.

SUMMARY

Embodiments of the present invention are directed to a computer-implemented method for creating test cases. A non-limiting example of the computer-implemented method includes receiving a verbal test plan for a computing system and analyzing the verbal test plan to identify a plurality of keywords. The method also includes mapping each known keyword of the plurality of keywords to an existing grammar and obtaining, from a user, a definition for a new grammar for each unknown keyword of the plurality of keywords. The method further includes analyzing a software being tested on the computing system and creating a test plan by respectively applying the new grammar and the existing grammar of the plurality of keywords to the software being tested.

Embodiments of the present invention are directed to a system for creating test cases. A non-limiting example of the system includes a processor configured to receive a verbal test plan for a computing system and analyze the verbal test plan to identify a plurality of keywords. The processor is also configured to map each known keyword of the plurality of keywords to an existing grammar and obtain, from a user, a definition for a new grammar for each unknown keyword of the plurality of keywords. The processor is further configured to analyze a software being tested on the computing system and create a test plan by respectively applying the new grammar and the existing grammar of the plurality of keywords to the software being tested.

Embodiments of the invention are directed to a computer program product for creating test cases, the computer program product comprising a computer readable storage medium having program instructions embodied therewith. The program instructions are executable by a processor to cause the processor to perform a method. A non-limiting example of the method includes receiving a verbal test plan for a computing system and analyzing the verbal test plan to identify a plurality of keywords. The method also includes mapping each known keyword of the plurality of keywords to an existing grammar and obtaining, from a user, a definition for a new grammar for each unknown keyword of the plurality of keywords. The method further includes analyzing a software being tested on the computing system and creating a test plan by respectively applying the new grammar and the existing grammar of the plurality of keywords to the software being tested.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
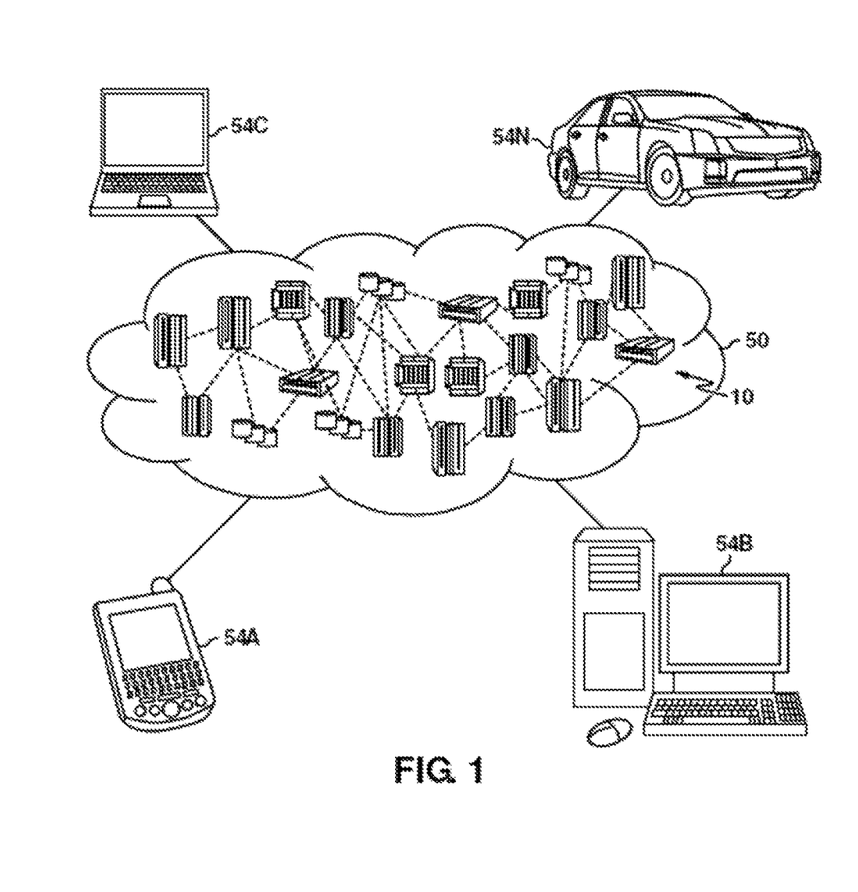
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
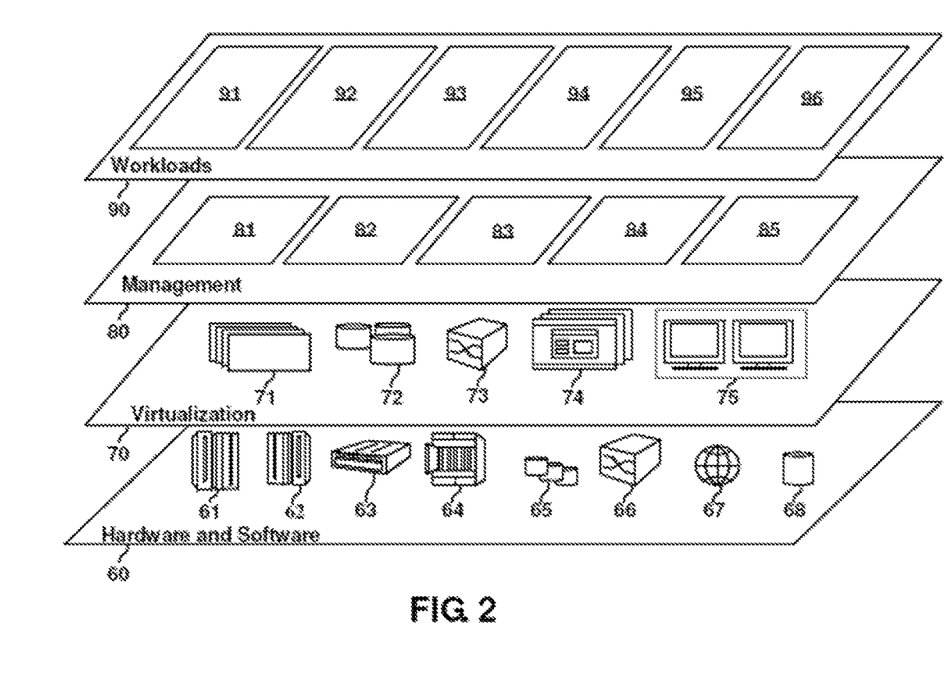
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test case generation 96.

Figure 3:
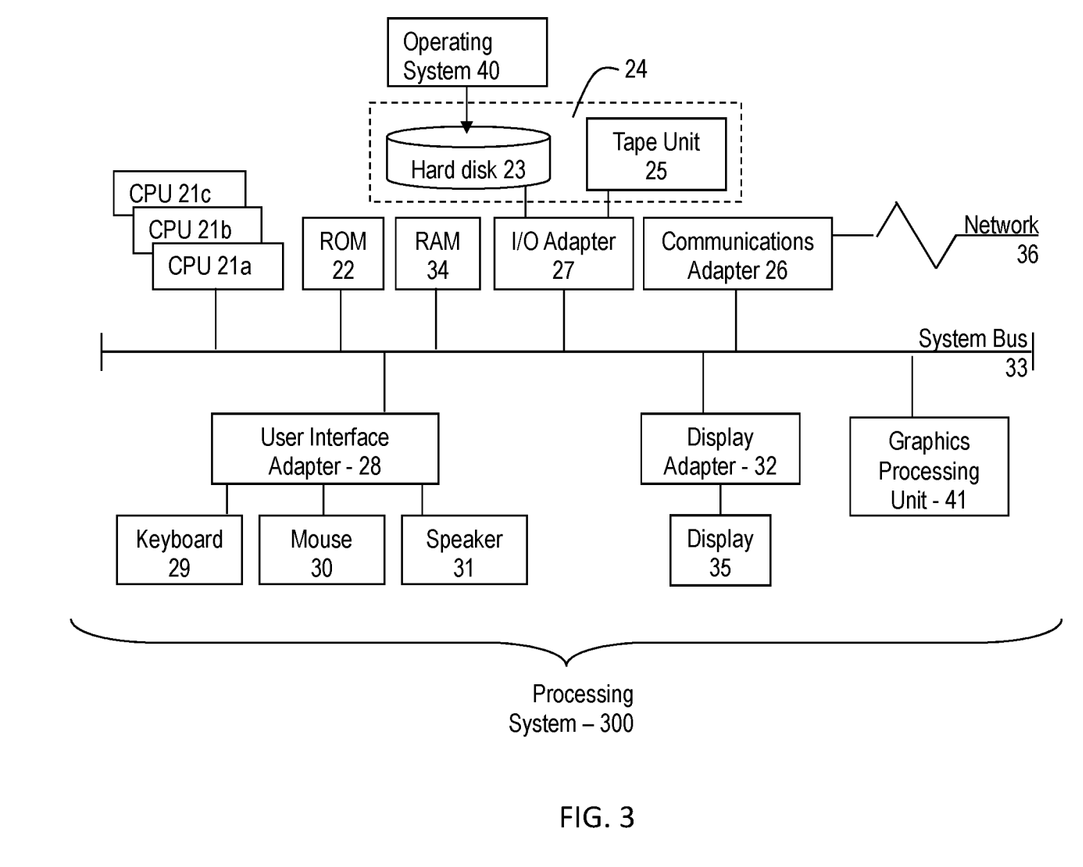
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super 110 chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Figure 4:
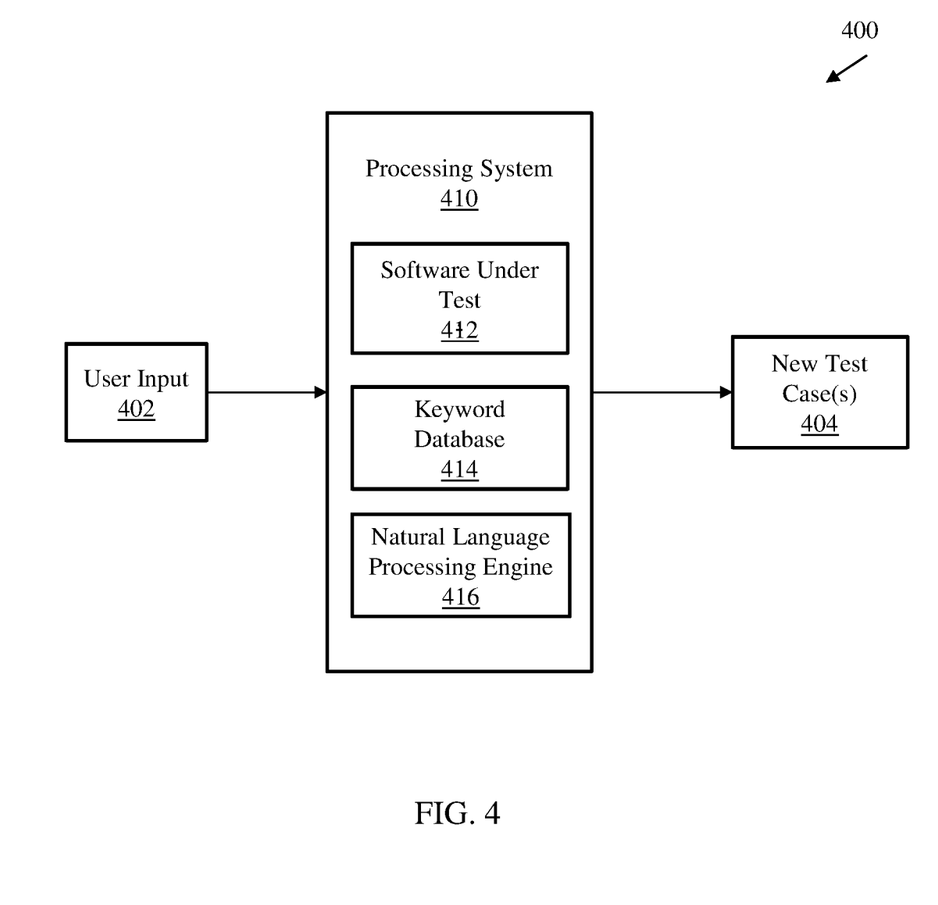
FIG. 4 depicts a system for voice controlled generation of keywords for test cases according to one or more embodiments of the invention.

Turning now to a more detailed description of aspects of the present invention, FIG. 4 depicts a block diagram of a system 400 for voice controlled generation of keywords for test cases according to one or more embodiments of the invention. The system 400 includes a processing system 410 that includes software 412 to be tested, a keyword database 414 and a natural language processing engine 416. In one or more embodiments of the invention, the processing system 410 can be implemented on the processing system 300 found in FIG. 3. Additionally, the cloud computing system 50 can be in wired or wireless electronic communication with one or all of the elements of the processing system 410. Cloud 50 can supplement, support or replace some or all of the functionality of the elements of the processing system 410. Additionally, some or all of the functionality of the elements of processing system 410 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

The processing system 410 is configured to receive user input 402 that includes a verbal test plan for testing the software 412 under test on the processing system 410. The verbal test plan is a spoken natural language set of instructions that the processing system 410 will interpret and execute to generate the test case. The natural language processing engine 416 of the processing system 410 analyzes the verbal test plan to parse the verbal test plan into a series of keywords. The processing system 410 is configured to compare the keywords to keywords stored in the keyword database 414. In exemplary embodiments, the keyword database 414 stores keywords and an associated grammar for each keyword. The keywords stored in the database can be keywords that were previously created by the user or can be default keywords that are associated with the software 412, the operating system of the processing system 410, and/or a user interface of the processing system 410.

In response to identifying a keyword that is not contained within the keyword database 414, the processing system 410 is configured to prompt the user to define a grammar for the keyword and to store the keyword and the grammar in the keyword database 414. In exemplary embodiments, the processing system 410 can receive the grammar of the keyword from the user verbally or through the user interface of the processing system 410. The grammar for the unknown keyword can be based on one or more known grammars stored in the keyword database.

As used herein the term keyword refers to a function that can be executed by a processing system. For example, if a user says "create an email to bob" the processing system will identify the keyword "create an email to" as a function that the processing system can perform. Each keyword will have an associated grammar, which as used herein refers to a set of programming instructions needed to perform the function defined by keyword. In the above example, the grammar would include an instruction to open an email program, an instruction to create a new email message, and an instruction to fill in the to address with the name provided.

In exemplary embodiments, the processing system 410 analyzes the software 412 being tested and generates the test plan 404 by applying the grammar for each keyword to the software 412 to create completed keywords and then combines the completed keywords. In addition, the completed keywords can be created by applying the grammar for each keyword to the operating system of the processing system 410, and/or a user interface of the processing system 410. In exemplary embodiments, the user input 402 also includes user input from a mouse and/or keyboard that is used to create a grammar for unknown keywords provided by the user.

Figure 5:
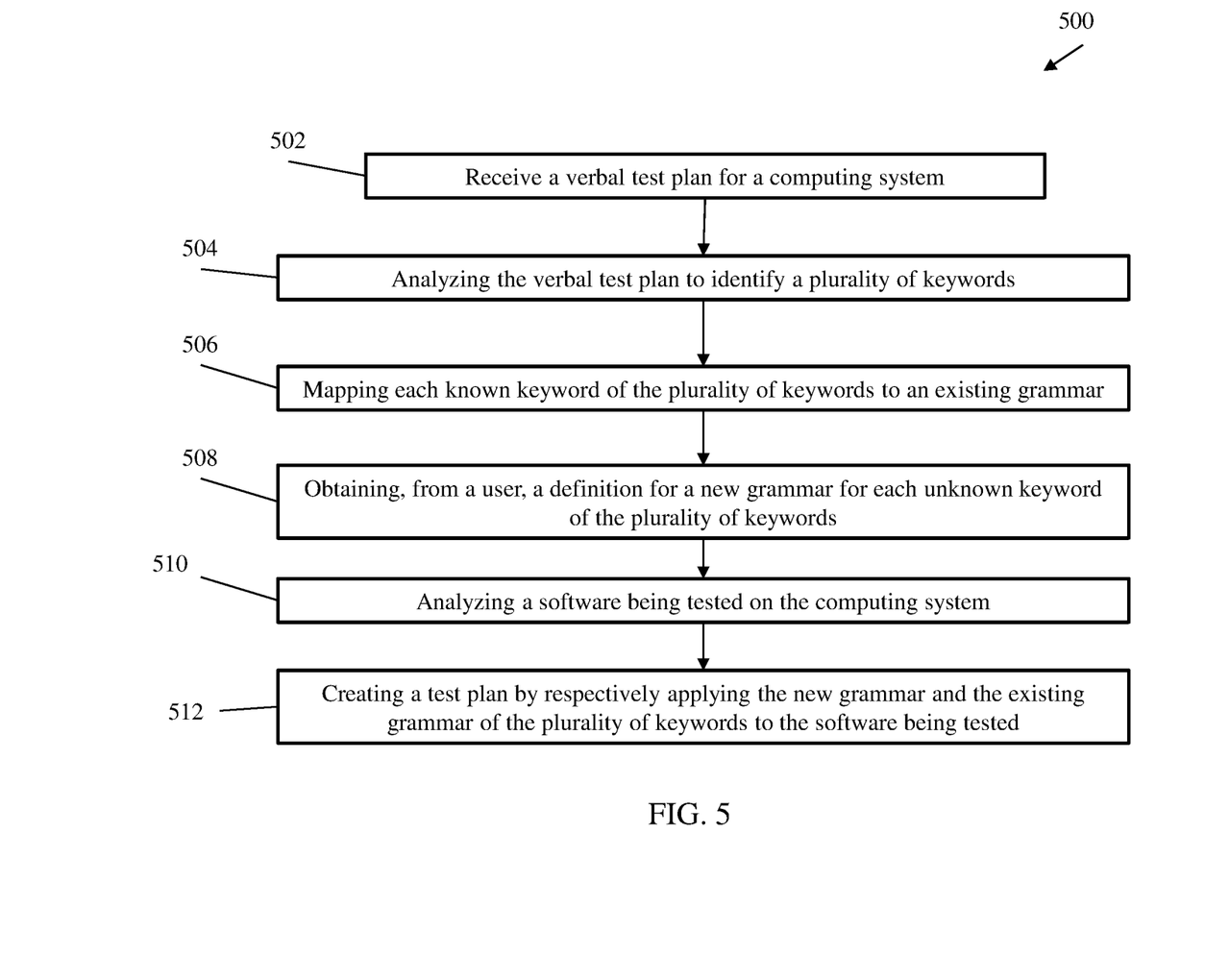
FIG. 5 depicts a flow diagram of a method for voice controlled generation of keywords for test cases according to one or more embodiments of the invention.

FIG. 5 depicts a flow diagram of a method for voice controlled generation of keywords for test cases according to one or more embodiments of the invention. The method 500 includes receiving verbal test plan for a computing system, as shown at block 502. In exemplary embodiments, the verbal text plan is obtained via a microphone and is stored as an audio file. Next, as shown at block 504, the method 500 includes analyzing the verbal test plan to identify a plurality of keywords. In one embodiment, the verbal test plan is analyzed by a natural language processing engine to identify the plurality of keywords. Each of the plurality of keywords is associated with one or more functions that the computing system is configured to perform; this association can be stored in a keyword database such as the one shown in FIG. 4. Next, as shown at block 506, the method 500 includes mapping each known keyword of the plurality of keywords to an existing grammar. In exemplary embodiments, the existing grammar includes a set of programming instructions that are required to perform a function defined by an associated known keyword. The method 500 also includes obtaining, from a user, a definition for a new grammar for each unknown keyword of the plurality of keywords, as shown at block 508. In one embodiment, the definition provided by the user for the new grammar includes one or more existing grammar. For example, the keyword "check email" may be associated with a grammar that includes opening an email program and an unknown keyword of "create email" is detected. In this example, the user can provide a definition for associated grammar that includes the grammar of check email, which opens the email program, and also includes executing a function to create a draft email.

Next, as shown at block 510, the method 500 includes analyzing a software being tested on the computing system. In exemplary embodiments, analyzing the software being tested includes determining the functions that the software is capable of performing. The method 500 also includes creating a test plan by respectively applying the new grammar and the existing grammar of the plurality of keywords to the software being tested, as shown at block 512. In exemplary embodiments, applying the grammars to the software being tested includes mapping the functions in the grammars to the available functions of the software.

In exemplary embodiments, the test plan is further created based on non-keyword input as part of the verbal test plan. In one example, the verbal test plan includes "open xyz.com" and the keyword "open website" is identified by the processing system. The grammar for "open website" includes executing a function to open a web browsing application and to enter a specified address in the address bar, where the specified address is part of the verbal test plan that is extracted by the processing system an applied to the grammar to form the completed grammar.

In exemplary embodiments, the test plan is further based on applying the new grammar and the existing grammar of the plurality of keywords to a user interface of the computing system. For example, certain keywords and/or grammars may apply to different user interfaces as different user interfaces can include unique means of user interaction, such as swiping left/right on a mobile device with a touchscreen. Likewise, in some embodiments, the test plan is further based on applying the new grammar and the existing grammar of the plurality of keywords to an operating system of the computing system.

Figure 6:
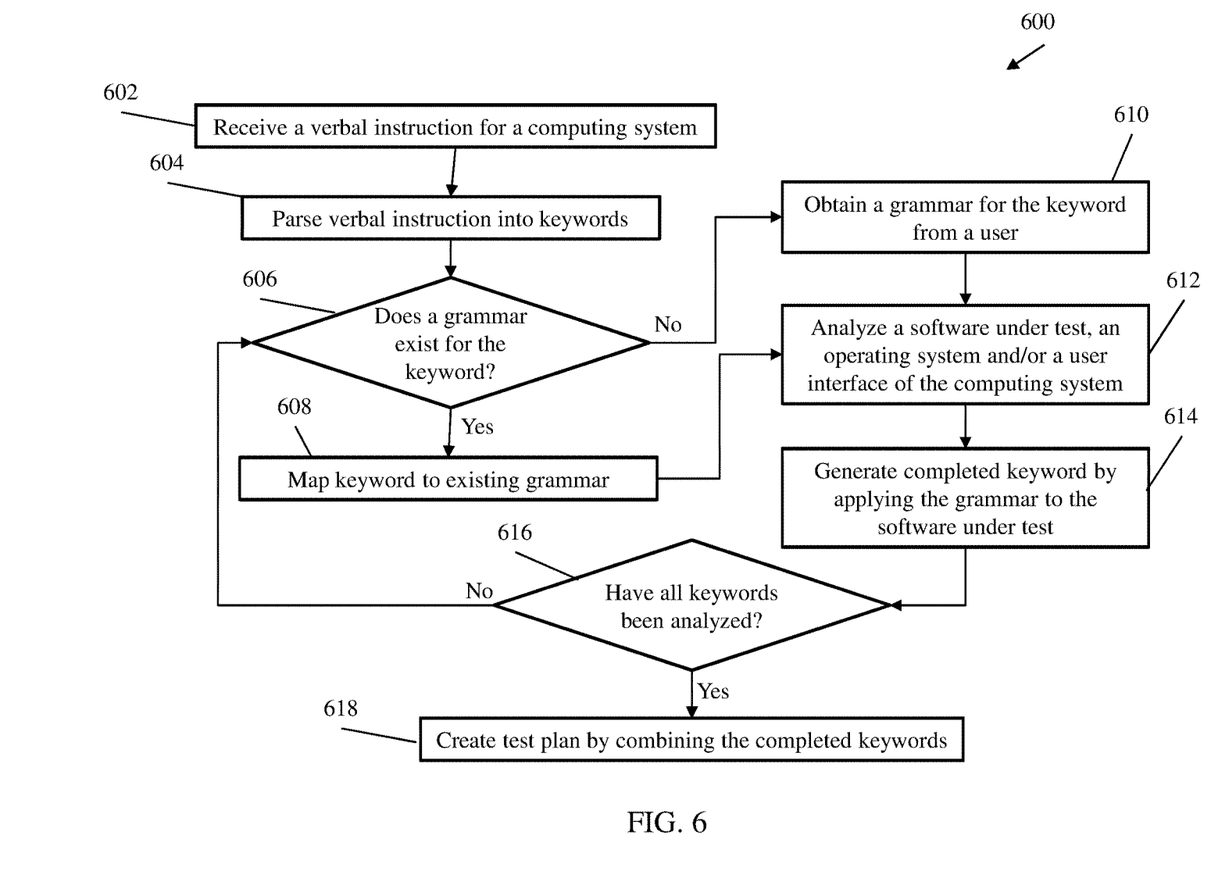
FIG. 6 depicts a flow diagram of another method for voice controlled generation of keywords for test cases according to one or more embodiments of the invention.

FIG. 6 depicts a flow diagram of another method for voice controlled generation of keywords for test cases according to one or more embodiments of the invention. The method 600 includes receiving a verbal instruction for a computing system, as shown at block 602. Next, as shown at block 604, the method 600 includes parsing verbal instruction into keywords. At decision block 606, the method 600 determines if a grammar exists for each parsed keyword. If a grammar exists, the method 600 proceeds to block 608 and maps the parsed keyword to the existing grammar. Otherwise, the method 600 proceeds to block 610 and obtains a grammar for the keyword from a user.

In one embodiment, obtaining a grammar from a user includes receiving an identification of the functions that are part of the grammar and the order in which the functions need to be executed. The identification of the functions can be provided verbally or via a user interface such as a keyboard or touchscreen. For example, if the user says "Send an email to Bob" and there is no "send email to" grammar that exists, the user would be prompted to define the grammar by providing the step/functions for the grammar. In this case, the user would define the grammar as (1) open email, (2) type in email box, (3) put in to field, and (4) press send. In one embodiment, the grammar definition provided by the user can include one or more known keywords and the grammar associated with the unknown keyword will be dependent on the grammar for the known keyword. Continuing with the above example, the term "open email" may be a keyword that has an associated known grammar that opens a web browsing application and navigates to a web based email website.

As shown at block 612, the method 600 includes analyzing one or more of the software under test, an operating system, and the user interface of the operating system. Next, as shown at block 614, the method 600 includes generating completed keyword by applying the grammar to the software under test, the operating system and the user interface of the computing system. Next, as shown at decision block 616, the method includes determining if all of the parsed keywords have been analyzed. If all of the parsed keywords have been analyzed, the method 600 proceeds to block 618 and creates a test plan by combining the completed keywords. Otherwise, the method returns to block 606.

In one example, the verbal test plan includes "Open the website xyz.com, log in, and press start." This test plan is processed by the natural language processing engine into the following keywords: start web browser, go to address; log in to account; and press start. These keywords are respectively associated with the following grammars: open web browsing application, enter into address bar and press enter; click on login link; and click on start link. These grammars are then applied to the software is under test, which may be, for example, the web browsing application. The grammars are completed by inputting the additional information extracted by the natural language processing engine and the test plan is stored for execution.

In exemplary embodiments, the generated test cases are executed at a different time from when they are created and as a result, changes in the computing system can cause failure of the execution of a grammar. In the case where a keyword fails when it is run, the test environment will re-analyze the software under test, the operating system and user interface of the computing system and will update test paths to attempt to fix the underlying code for the keyword before resolving to a true test failure. In one example, if part of a test case is to "press submit button" but the submit button variable name changed from "submit button" to "submitButton", the underlying code fail to execute, when the overall test shouldn't fail because functionality didn't change. This self-maintenance would allow for more accurate failure reporting, and a user would not need to manipulate the test code.

Additional processes may also be included. It should be understood that the processes depicted in FIGS. 5 and 6 represent illustrations and that other processes may be added or existing processes may be removed, modified, or rearranged without departing from the scope and spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for voice controlled generation of keywords for test cases, the method comprising:
   receiving, by a processor, a verbal test plan for a computing system from a user;
   analyzing, by the processor, the verbal test plan to identify a plurality of keywords;
   mapping, by the processor, each known keyword of the plurality of keywords to an existing grammar;
   obtaining, by the processor from the user in response to identifying an unknown keyword of the plurality of keywords, a definition for a new grammar for each unknown keyword of the plurality of keywords, wherein the definition includes an identification of one or more functions that are part of the new grammar and an order in which the one or more functions are executed;
   analyzing, by the processor, a software being tested on the computing system, wherein analyzing the software being tested includes determining functions that the software being tested is capable of performing; and
   creating a test plan by respectively applying the new grammar and the existing grammar of the plurality of keywords to the software being tested.

2. The method of claim 1, wherein the definition for the new grammar includes one or more existing grammar.

3. The method of claim 1, wherein the test plan is further based on applying the new grammar and the existing grammar of the plurality of keywords to a user interface of the computing system.

4. The method of claim 1, wherein the test plan is further based on applying the new grammar and the existing grammar of the plurality of keywords to an operating system of the computing system.

5. The method of claim 1, wherein the verbal test plan is analyzed by a natural language processing engine to identify the plurality of keywords.

6. The method of claim 1, wherein each of the plurality of keywords is associated with one or more functions that the computing system is configured to perform.

7. The method of claim 1, wherein the existing grammar includes a set of programming instructions required to perform a function defined by an associated known keyword.

8. A system for voice controlled generation of keywords for test cases, comprising:
   a memory having computer readable instructions; and
   a processor for executing the computer readable instructions, the computer readable instructions including instructions for:
   receiving a verbal test plan for a computing system from a user;
   analyzing the verbal test plan to identify a plurality of keywords;
   mapping each known keyword of the plurality of keywords to an existing grammar;
   obtaining, from the user in response to identifying an unknown keyword of the plurality of keywords, a definition for a new grammar for each unknown keyword of the plurality of keywords, wherein the definition includes an identification of one or more functions that are part of the new grammar and an order in which the one or more functions are executed;
   analyzing a software being tested on the computing system, wherein analyzing the software being tested includes determining functions that the software being tested is capable of performing; and
   creating a test plan by respectively applying the new grammar and the existing grammar of the plurality of keywords to the software being tested.

9. The system of claim 8, wherein the definition for the new grammar includes one or more existing grammar.

10. The system of claim 8, wherein the test plan is further based on applying the new grammar and the existing grammar of the plurality of keywords to a user interface of the computing system.

11. The system of claim 8, wherein the test plan is further based on applying the new grammar and the existing grammar of the plurality of keywords to an operating system of the computing system.

12. The system of claim 8, wherein the verbal test plan is analyzed by a natural language processing engine to identify the plurality of keywords.

13. The system of claim 8, wherein each of the plurality of keywords is associated with one or more functions that the computing system is configured to perform.

14. The system of claim 8, wherein the existing grammar includes a set of programming instructions required to perform a function defined by an associated known keyword.

15. A computer program product comprising a computer readable storage medium having program instructions embodied therewith the program instructions executable by a computer processor to cause the computer processor to perform a method, comprising:
 receiving a verbal test plan for a computing system from a user;
 analyzing the verbal test plan to identify a plurality of keywords;
 mapping each known keyword of the plurality of keywords to an existing grammar;
 obtaining, from the user in response to identifying an unknown keyword of the plurality of keywords, a definition for a new grammar for each unknown keyword of the plurality of keywords, wherein the definition includes an identification of one or more functions that are part of the new grammar and an order in which the one or more functions are executed;
 analyzing a software being tested on the computing system, wherein analyzing the software being tested includes determining functions that the software being tested is capable of performing; and
 creating a test plan by respectively applying the new grammar and the existing grammar of the plurality of keywords to the software being tested.

16. The computer program product of claim 15, wherein the definition for the new grammar includes one or more existing grammar.

17. The computer program product of claim 15, wherein the test plan is further based on applying the new grammar and the existing grammar of the plurality of keywords to a user interface of the computing system.

18. The computer program product of claim 15, wherein the test plan is further based on applying the new grammar and the existing grammar of the plurality of keywords to an operating system of the computing system.

19. The computer program product of claim 15, wherein the verbal test plan is analyzed by a natural language processing engine to identify the plurality of keywords.

20. The computer program product of claim 15, wherein each of the plurality of keywords is associated with one or more functions that the computing system is configured to perform.

\* \* \* \* \*